No. 659,235. Patented Oct. 9, 1900.
T. B. JEFFERY.
BICYCLE GEARING CASE.
(Application filed Feb. 23, 1898.)
(No Model.) 2 Sheets—Sheet 1.
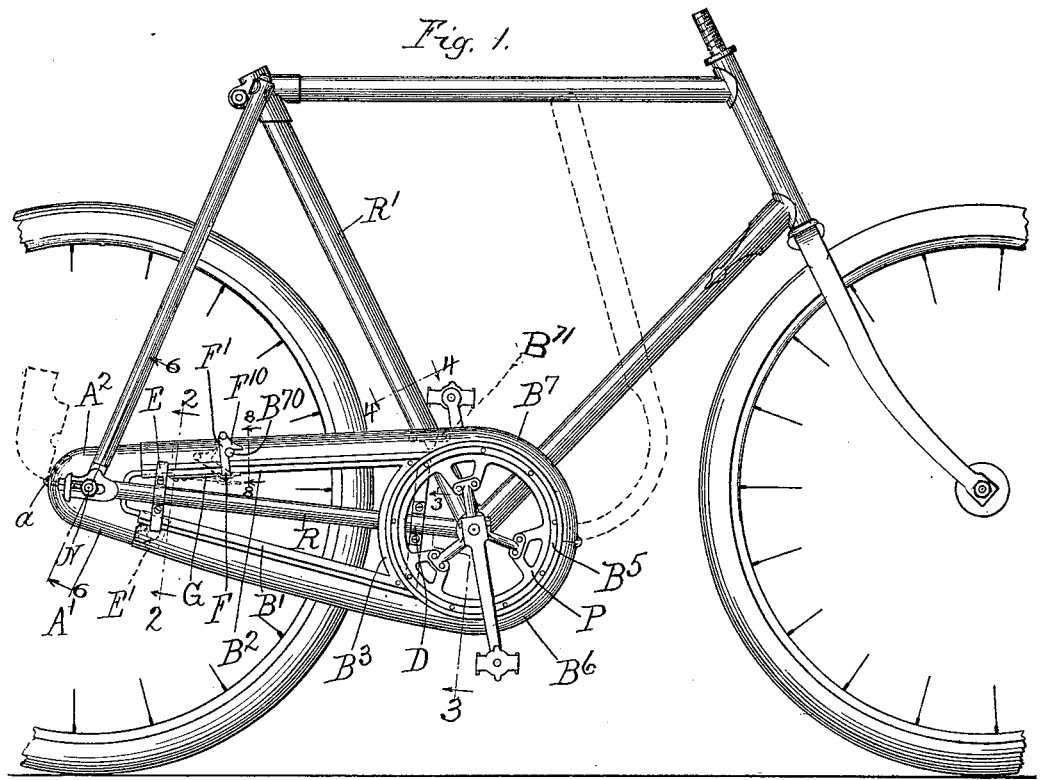
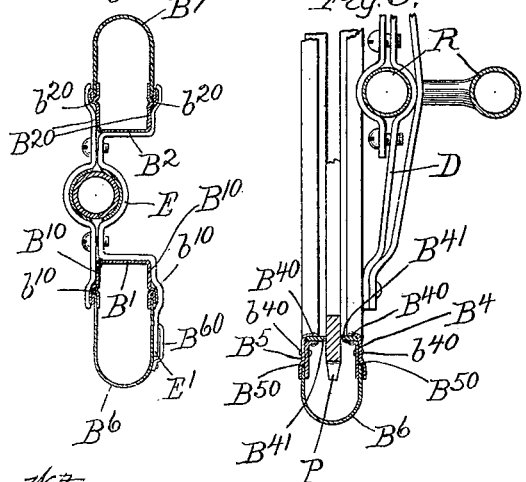
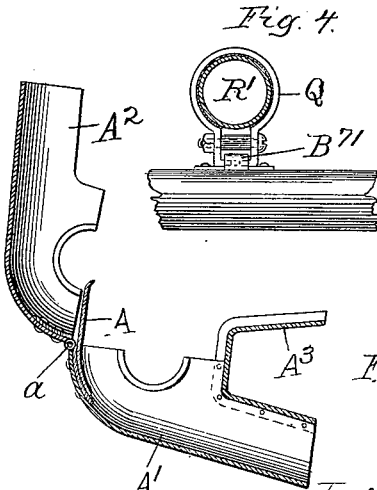
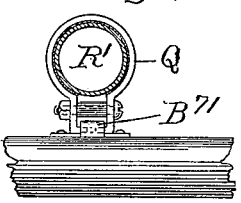
Witnesses:
Edward T. Wray.
Harry White.
Inventor:
Thos. B. Jeffery
by Burton & Burton
his Attys.

No. 659,235. Patented Oct. 9, 1900.
T. B. JEFFERY.
BICYCLE GEARING CASE.
(Application filed Feb. 23, 1898.)
(No Model.) 2 Sheets—Sheet 2.
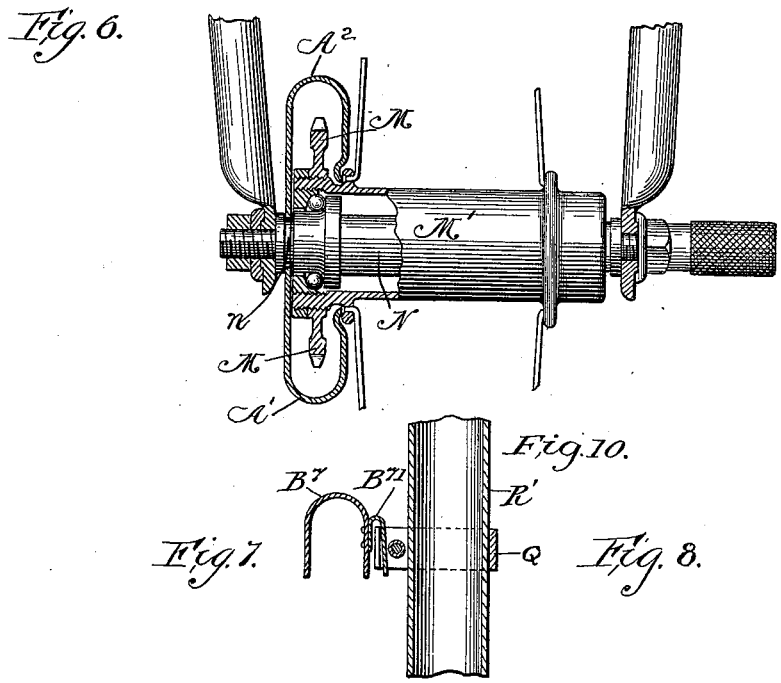
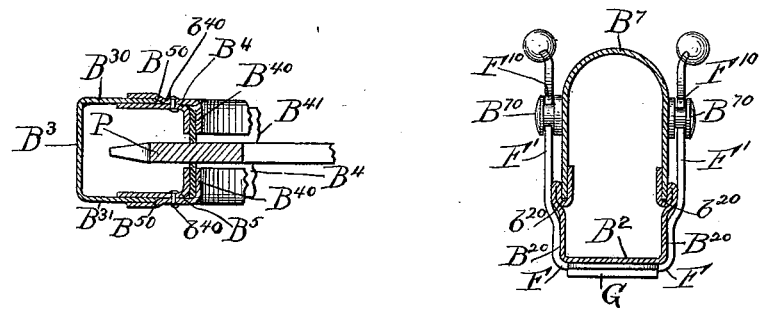
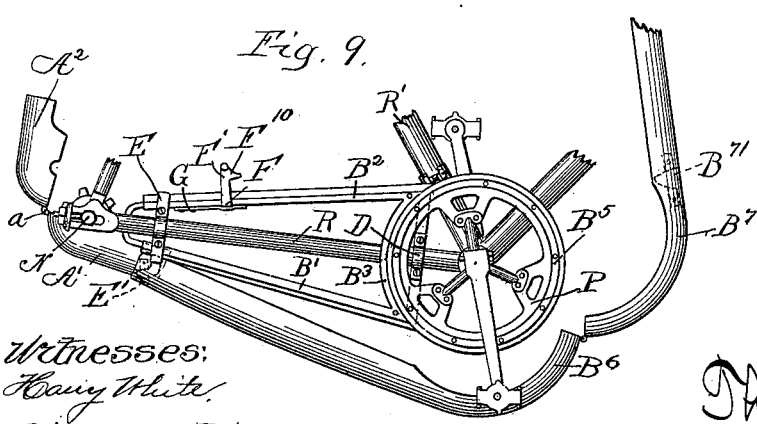
Witnesses:
Harry White,
Edward T. Wray.
Inventor:
Thos. B. Jeffery
by Burton Burton
his Atty.

UNITED STATES PATENT OFFICE.

THOMAS B. JEFFERY, OF CHICAGO, ILLINOIS.

BICYCLE GEARING-CASE.

SPECIFICATION forming part of Letters Patent No. 659,235, dated October 9, 1900.

Application filed February 23, 1898. Serial No. 671,253. (No model.)

*To all whom it may concern:*

Be it known that I, THOMAS B. JEFFERY, a citizen of the United States, residing at Chicago, county of Cook, and State of Illinois, have invented certain new and useful Improvements in Bicycle Gearing-Cases, of which the following is a specification, reference being had to the accompanying drawings, forming a part thereof.

In the drawings, Figure 1 is a side elevation of a bicycle having my improved gearing-case applied in closing the driving sprocket-wheel at the crank-hanger and the driven sprocket-wheel at the rear wheel and the chain between. Fig. 2 is a detail section at the line 2 2 on Fig. 1. Fig. 3 is a detail section at the line 3 3 on Fig. 1. Fig. 4 is a detail section at the line 4 4 on Fig. 1. Fig. 5 is a detail section of the portion of the case which incloses the driven sprocket-wheel, the same being shown open, the section being in a plane transverse to the axis of the wheel. Fig. 6 is a detail sectional elevation of the rear-wheel hub and fork ends of a bicycle having my gearing-case, the section of certain parts being made at the line 6 6 on Fig. 1. Fig. 7 is a detail section of the case and sprocket-wheel rim in the plane of the axles of the crank-shaft and rear wheel. Fig. 8 is a detail section at the line 8 8 on Fig. 1. Fig. 9 is a side elevation showing the case parted and unfolded at both ends as in applying and removing it from the bicycle. Fig. 10 is a detail section at the line 10 10 on Fig. 7.

My improved gearing-case is designed to completely inclose the driven and driving sprocket-wheels and the connecting-chain, so as to exclude dirt from all three parts, and at the same time leave the driving sprocket-wheel uninclosed at the central part—that is, to inclose the rim only—thus avoiding the clumsy appearance which results from inclosing the entire wheel.

This case comprises two separable parts, one of which incloses the driven pinion and a short portion of the path of the chain running thereto and therefrom, and the other portion comprises an annular sheath for the rim of the driving sprocket-wheel, and two portions extending therefrom inclosing the chain running to and from the wheel, the corresponding chain inclosing extensions of these two parts being adapted to telescope one within the other, and as constructed and represented the said chain-inclosing extensions of the first-mentioned part are arranged to telescope within the chain-inclosing extensions of the second of said parts. The part which incloses the driven sprocket-pinion M is a hood made of two parts $A'$ and $A^2$, parted diametrically with respect to the wheel and hinged together at $a$ at the outer side of the latter. The part $A'$ has formed rigidly with it the channeled extensions $A^3$, which completes the inclosure at the inner side of the wheel and along the inner side of the path of the chain as far as the parts $A'$ and $A^2$ extend, and the part $A^2$ is without any inclosing channel at the inner side, being adapted to shut into the channel-piece $A^3$ when it is folded up into position about the wheel. At the inner side of the sprocket-pinion M the hinged parts $A'$ and $A^2$ are shaped to fit as closely as consistent with avoiding friction about the hub $M'$ of the drive-wheel, and at the outer side they are fitted closely into a groove $n$, which may be cut into the axle N to receive the edges of the case. A spring $A^4$ is provided, having one end secured inside the part $A'$ and the other end extending into the part $A^2$ and reacting with a tendency to open the case by folding about the hinge $a$. The part which incloses the driving sprocket-wheel and the chain running thereto and therefrom consists of an inner framework, comprising the channel-bars $B'$ and $B^2$, which extend, respectively, along the upper and lower path of the chain, at the inner side thereof, and a segmental channel-bar $B^3$, which extends abreast of—that is, around the inner side of—the driving sprocket-wheel P, between the ply of the chain running thereto and therefrom and connecting the ends of the channel-bars $B'$ and $B^2$. This inner framework comprises also two annular wheel-guards $B^4$ and $B^5$, which are rigid, respectively, with the two sides $B^{30}$ and $B^{31}$ of the segmental channel-bar $B^3$ and project therefrom at opposite sides of the sprocket-wheel P. Each of these annular guards is quadrantal or right angular in cross-section, having one lip, $B^{50}$, in a plane parallel to the plane of rotation of the wheel and the other lip, $B^{40}$, in a plane at right angles to the former, extending toward the plane of the wheel. For reasons which will hereinafter appear each of these lips is desirably grooved in its edge, and such grooves are formed by making the annular guard of two annular parts, each quadrantal or right angular in cross-section, lodged one within the curve or angle of the other and the two being riveted together, as shown at $b^{40}\ b^{40}$, &c. Between the corresponding lips of the two pieces, which together constitute the lips $B^{40}\ B^{40}$, felt strips $B^{41}\ B^{41}$ are retained and project toward the plane of the wheel and are designed to touch the opposite surfaces of the wheel-rim, and thus with a minimum friction close the space and exclude dust from the sprockets and chain traveling thereon. The grooves which are formed in the lips $B^{50}\ B^{50}$ between the two annular parts are designed to receive the edges of the cap-pieces $B^6$ and $B^7$, which constitute a hood for the wheel and chain and which, with the inner framework described, complete the portion of the case which incloses the driving sprocket-wheel and chain running therefrom, as described. The cap-piece $B^6$ incloses the lower ply of the chain and extends around the lower half of the outer half of the sprocket-wheel. The edges of the curved portion which extends about the sprocket-wheel P lodge in the grooves formed, as described, in the edges of the lips $B^{50}\ B^{50}$, and these grooves are continuous with grooves $b^{10}\ b^{10}$, which are formed in the edges of the sides $B^{10}\ B^{10}$ of the channel-bar $B'$ and receive and guard the edges of the straight portion of the cap $B^6$. These grooves $b^{10}$ are preferably, because most economically and conveniently, made by folding the sheet metal of the sides $B^{10}$ of the channel-bar $B'$ inwardly upon itself and then back outwardly, leaving the groove between the outwardly-folded edge and the adjacent fold of the metal as seen in Fig. 2. The cap $B^7$ is formed in a manner similar to the cap $B^6$, and as to its curved portion, which extends around the upper half of the outer half of the sprocket-wheel, it lodges in the grooves of the lips $B^{50}\ B^{50}$ of the guards $B^4$ and $B^5$ in the same manner as the cap $B^6$ and in the grooves $b^{20}\ b^{20}$, formed in the sides $B^{20}\ B^{20}$ of the channel-bar $B^2$, which are produced in the same manner as the similar grooves $b^{10}$ in the edges of the sides $B^{10}$ of the bar $B'$. A trussed brace or bracket D, formed in any manner adapting it to be clamped onto the tubular fork-arm R of the bicycle-frame near the crank-hanger, is made fast at its extremities to the segmental bar $B^3$, and a two-armed bracket or clamp E is made in two parts adapted to be clamped to the tubular fork-arm near the rear axle and is adapted also to clamp and rigidly hold the upper and lower channel-bars $B'$ and $B^2$ near the rear ends, and said bracket E has also a finger $E'$, which engages a loop $B^{60}$ on the side of the lower cap $B^6$ near the rear end and holds it rigid both with the channel-bar $B'$ at that end and with the bicycle-frame. It will be seen that the inner frame structure, comprising channel-bars $B'$ and $B^2$, segment $B^3$, and wheel-guards $B^4$ and $B^5$, is made substantially rigid with the frame by attachment thereto at both ends. The caps $B^6$ and $B^7$ are hinged together at the outer side of the sprocket-wheel P and are adapted to close up, respectively, below and above the upper channel-bars $B^2$ and $B'$ and about the outer half of the wheel-guards $B^4$ and $B^5$, engaging the grooves provided for their edges in said parts. Near the rear end of the upper cap $B^7$, I provide a latch F, in the form of a yoke, which embraces the channel-bar $B^2$ and whose side bars or fingers $F'\ F'$ have projecting hooks $F^{10}\ F^{10}$, which engage studs $B^{70}\ B^{70}$ on the cap $B^7$ and serve when thus engaged to lock the cap at that end firmly in place, covering the channel-bar. For convenience the yoke is retained in connection with a channel-bar by a spring G, which is riveted at one end to the channel-bar and at the free end is shaped to afford a seat for the cross-bar of the yoke, which is flat, and puts the spring under tension when the yoke is tipped back to unlatch it and release the cap. The spring serves not only to retain the latch in place on the case, but tends to hold it engaged with the stud $B^{70}$ when the latch is thrown up to proper position for such engagement, and it serves also to hold the latch out of the way when it is thrown down to disengaged position. When the cap $B^7$ is suitably latched to the remainder of the case, it will be seen that the entire case is made perfectly rigid and is being held rigidly with respect to the frame, except in so far as the case as a whole, even when thus locked up, being of light material, is liable to distortion by springing between its points of fastening. In order to reduce the liability to distortion or displacement from this cause to a minimum, I provide a bracket Q, clamped onto the principal upright post $R'$ of the frame at the point at which the upper channel-cap $B^7$ extends past such post, and on said cap $B^7$, I provide a hook $B^{71}$, for which a seat or place of engagement is made upon the bracket Q, so that as the cap is shut down in place over the chain the hook becomes engaged with the bracket.

I claim—

1. A bicycle gearing-case comprising two separable parts, one of which is a two-part hood adapted to inclose the driven pinion on the driving-wheel axle, and which is supported directly on such axle, the other of said parts comprising an annular hood for the driving-rim of the driving sprocket-wheel having an outer and inner circumferential wall, the latter being rifted to afford a path of rotation for the web of said driving-rim, and provided with positive supports extending to the frame proximate to said wheel; said parts having, each, hollow extensions adapted to telescope with each other and inclose the driving-chain between the wheels.

2. In a gearing-case, an inner frame comprising bars in the plane of the drive-chain extending along the inner side of both plies thereof, and a bar connecting their ends abreast of one of the sprocket-wheels on the side toward the other, and annular wheel-guards projecting rigidly from such connecting-bar at opposite sides of the wheel, the central opening in said guards being of such diameter as to laterally expose the wheel throughout the greater part of its diameter, in combination with an exterior hood encompassing the wheel and covering the chain and adapted to be seated on such inner frame.

3. In a bicycle gearing-case, a hood for the driven wheel parted diametrically and hinged together, and means by which it is supported on the bicycle-frame, combined with a channeled hood or cover for the driving-wheel, also parted diametrically and having the parts hinged together, corresponding proximate ends being telescoped, and means for locking the outer of said telescoped parts to hold it folded.

4. In a bicycle gearing-case, a hood for the driven wheel parted diametrically and hinged together, and means by which it is supported on the bicycle-frame, combined with a channeled cover or hood for the driving-wheel also parted diametrically and having the parts hinged together; corresponding proximate ends of said hoods being telescoped, whereby the hoods are adapted to be longitudinally separated; and annular wheel-guards and means for securing them rigidly to the bicycle-frame, the channeled parts of the driving-wheel hood being mounted on said wheel-guards; and means for locking the outer of said telescoped hoods to hold the hinged parts thereof folded together and seated.

5. A bicycle gearing-case consisting of a driven-wheel hood divided and having the parts hinged together; a hood or cover for the driving-wheel, also divided and having the parts hinged together; a rigid frame consisting of an upper channel-bar $B^2$, lower channel-bar $B'$, segmental channel-bar $B^3$, rigidly united; and the annular guards $B^5$ and $B^6$ projecting rigidly from said segmental channel-bar at opposite sides of the wheel; the divided and hinged hoods for the driving and driven wheels being adapted to be folded and engaged with said rigid frame.

6. In a bicycle gearing-case, in combination with a rigid frame comprising straight bars extending alongside the upper and lower plies of the chain between the same and the curved bar connecting said straight bars and extending abreast of the driving-wheel; rings $B^4$ and $B^5$, which are angular in radial cross-section, having one lip or flange of their angular structure extending in a plane parallel to the wheel, and the other extending cylindrically coaxial with the wheel, and the divided cover or hood for the wheel having its two parts hinged together and its two lateral edges adapted to lap respectively by the first-mentioned flanges of said rings.

7. In a gearing-case, the annular wheel-guards $B^4$ and $B^5$, quadrantal in cross-section and having the lips in the planes transverse to the axis of the wheel grooved in the edge, in combination with the caps $B^6$ and $B^7$ which have their edges entered in such groove.

In testimony whereof I have hereunto set my hand, in the presence of two witnesses, at Chicago, Illinois, this 19th day of February, 1898.

THOS. B. JEFFERY.

Witnesses:
O. B. JONES,
CHARLES T. JEFFERY.